United States Patent [19]
Carlsen

[11] Patent Number: 5,768,867
[45] Date of Patent: Jun. 23, 1998

[54] ROTARY BLADE FOR CUTTING GRASS AND THE LIKE

[76] Inventor: Harry R. Carlsen, 4604 Rosewood La., Plymouth, Minn. 55442

[21] Appl. No.: 699,534

[22] Filed: Aug. 19, 1996

[51] Int. Cl.⁶ .................................................. A01D 34/73
[52] U.S. Cl. .............................. 56/12.1; 56/12.7; 56/295; 56/DIG. 17; 30/276
[58] Field of Search ..................................... 56/12.7, 12.1, 56/17.5, 255, 295, DIG. 17, DIG. 20; 30/276

[56] References Cited

U.S. PATENT DOCUMENTS

| | | | |
|---|---|---|---|
| 3,895,440 | 7/1975 | Pitinger, Jr. ................................ | 30/347 |
| 4,054,993 | 10/1977 | Kamp et al. ................................ | 30/276 |
| 4,065,913 | 1/1978 | Fisher et al. ............................... | 56/295 |
| 4,112,653 | 9/1978 | Ballas et al. ............................... | 56/12.7 |
| 4,126,990 | 11/1978 | Fisher et al. ............................... | 56/295 |
| 4,186,239 | 1/1980 | Mize et al. ................................ | 428/399 |
| 4,295,324 | 10/1981 | Frantello et al. .......................... | 56/12.7 |
| 4,361,000 | 11/1982 | Friberg ..................................... | 56/13.4 |
| 4,461,138 | 7/1984 | Whitman .................................. | 56/12.7 |
| 4,962,630 | 10/1990 | Jones ........................................ | 56/12.7 |
| 5,048,278 | 9/1991 | Jones et al. ............................... | 56/295 |
| 5,406,708 | 4/1995 | Stephens et al. .......................... | 30/276 |
| 5,491,962 | 2/1996 | Sutliff et al. .............................. | 56/12.7 |

*Primary Examiner*—Terry Lee Melius
*Attorney, Agent, or Firm*—Haugen & Nikolai, P.A.

[57] ABSTRACT

A rotary blade including a disc and a ring secured to the disc, wherein the ring has cutting filaments that extend radially outward past the outer edge of the disc. As the disc is rotated the filaments are adapted for cutting grass and the like. Projections extending from the disc create an air turbulence that both lifts the vegetation to be cut and swirls the clippings to further mulch the clippings.

16 Claims, 3 Drawing Sheets

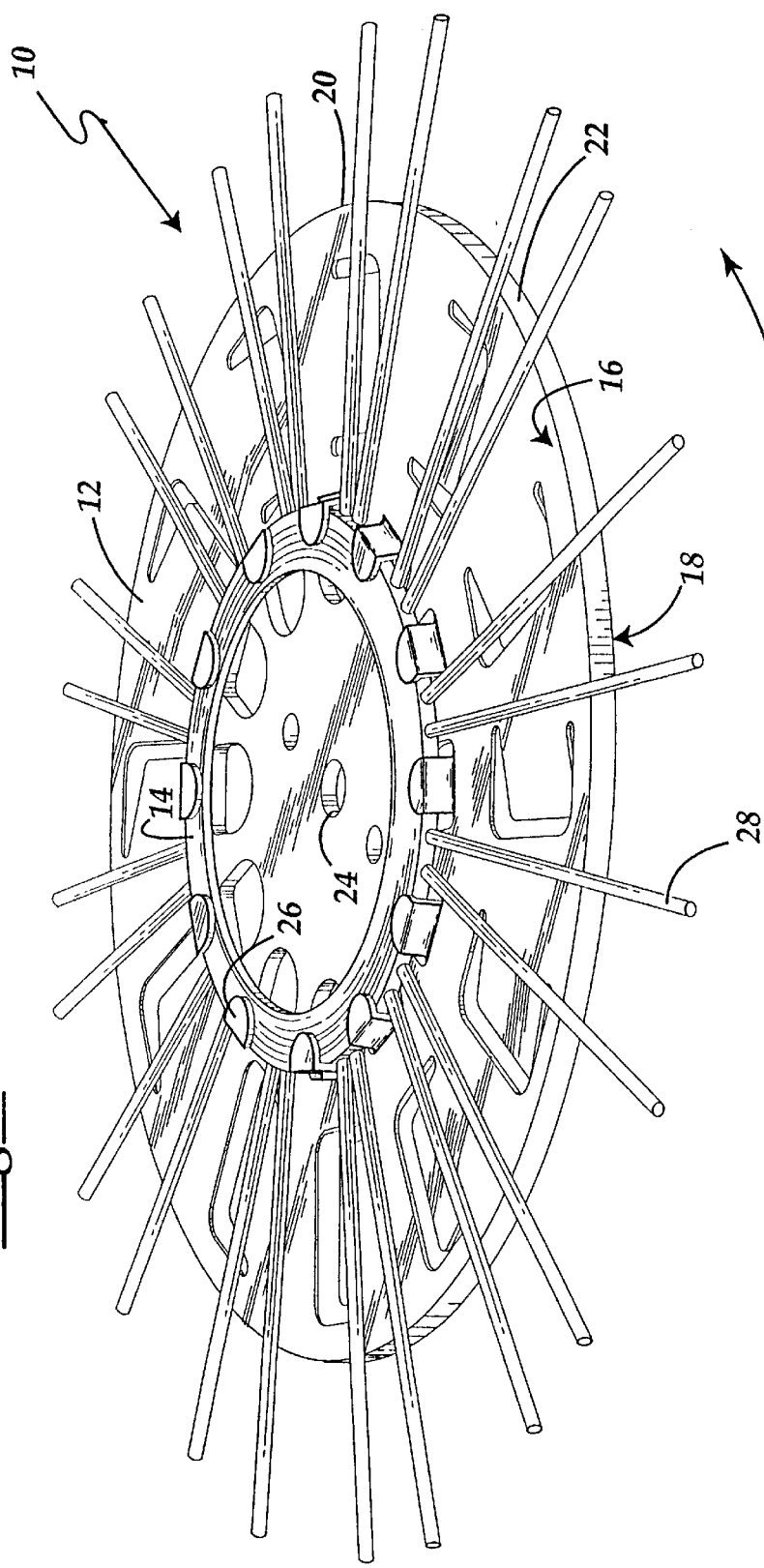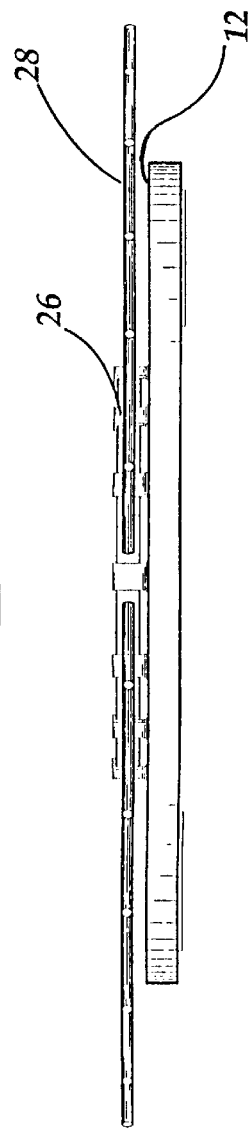

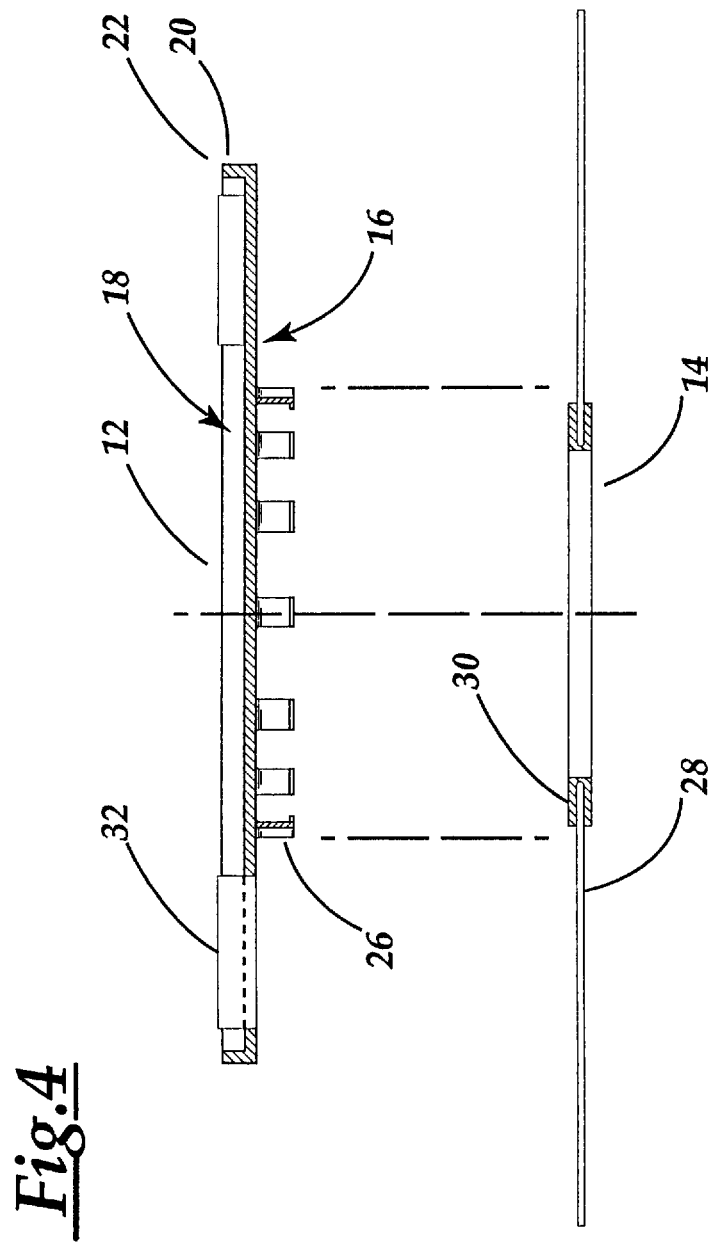

ROTARY BLADE FOR CUTTING GRASS AND THE LIKE

BACKGROUND OF THE INVENTION

I. Field of the Invention

This invention relates generally to a blade adapted for attachment to a rotary spindle of lawn care equipment. More particularly, this invention relates to a rotary blade having replaceable cutting filaments for cutting grass and the like, and further includes projections or scoops extending from the rotary blade that draws air and vegetation up towards the rotary blade.

II. Discussion of the Related Art

A typical lawn mower has a heavy steel bar with sharp edges that, when rotated, severs the grass and other vegetation at a uniform height. In the past, a rotary type mower and steel bar have been preferred because of their ability to efficiently cut through tall and thick vegetation. Devices having a cutting filament line which attach to lawn mowers and trimmers have been disclosed as a viable replacement to the steel cutting blade. In this regard, reference is made to Friberg, U.S. Pat. No. 4,361,000 (hereinafter the 000 patent), Jones, U.S. Pat. No. 4,962,630 (hereinafter the 630 patent), Fisher et al., U.S. Pat. No. 4,126,990 (hereinafter the 990 patent), Frantello et al., U.S. Pat. No. 4,295,324 (hereinafter the 324 patent), Ballas et al., U.S. Pat. No. 4,112,653 (hereinafter the 653 patent). Although moderately successful, the disclosed devices require individual replacement of the filaments, increasing the time spent for filament replacement.

Specifically, the 000 patent discloses a bagging monofilament line lawn mower having a fan that rotates within the lawn mower to create an airflow in the cutting chamber having both vertical and circumferential components. One end of the cutting monofilament is rigidly attached to the fan, while the other end of the monofilament extends out past the outer edge of the fan through a grommet. Although the manner of attachment was not deemed critical to the disclosed invention, each monofilament attached to the fan would have to be replaced individually. Likewise, in the other referenced patents the cutting filaments must be replaced individually. The present invention overcomes these and other disadvantages of the prior art.

OBJECTS

It is accordingly a principal object of the present invention to provide a cutting device that is attachable to a vegetation cutting mechanism, wherein the cutting device has a plurality of cutting filaments that are simultaneously removable and replaceable.

Another object of the present invention is to provide an economic cutting device having a replaceable cutting element that draws the vegetation to be cut up towards the rotating cutting filaments, thereby cutting the vegetation at an even height.

Yet another object of the present invention is to provide an improved cutting device having a plurality of cutting filaments, wherein the filaments are manufactured from a polymer filled with an abrasive filler.

Still another object of the present invention is to provide a disc that is attached to the rotary shaft of a vegetation cutting mechanism, wherein a ring having radially extending filaments is removably secured to the disc.

A further object of the present invention is to provide a cutting device incorporating a plurality of filaments that are readily, simultaneously replaceable.

These and other objects, as well as these and other features and advantages of the present invention will become apparent to those skilled in the art from a review of the summary of the invention, detailed description, and claims, especially when considered in conjunction with the accompanying drawings wherein like numerals in the several views refer to corresponding parts.

SUMMARY OF THE INVENTION

In accordance with the foregoing objects of the present invention, a rotary blade is provided. The rotary blade includes a disc and an annular ring secured to the disc. The disc has an upper and lower planar surface and an outer edge defined by a perimeter of the disc. The disc is attached to the rotary shaft of the selected vegetation cutting mechanism through a bore extending through the thickness dimension of the disc. Extending from the upper planar surface of the disc are a plurality of radially spaced projections. Apertures corresponding to each of the plurality of projections extend through the disc, whereby when the disc is rotated, the projections create an air turbulence that both tends to lift the vegetation upward and swirls the clippings about the central axis of the disc. A lip extends upward from the outer edge around the perimeter of the disc and provides additional rigidity to the disc.

The ring includes a central hub and a plurality of cutting elements extending radially outward from the central hub. The ring is secured to the lower planar surface of the disc such that the plurality of cutting filaments extend outward beyond the outer edge of the disc. Radially spaced hooks extend from the lower surface of the disc and provide a retaining means for removably securing the ring against the lower planar surface of the disc.

BRIEF DESCRIPTION OF THE DRAWINGS

FIG. 1 is a perspective view of an inverted rotary blade of the present invention designed for counterclockwise rotation;

FIG. 2 is a side elevational view of the rotary blade of the type shown in FIG. 1;

FIG. 4 is an exploded side elevational partial sectional view of the disc and annular ring of the type shown in FIG. 1, with several projections removed for clarity to illustrate the inner surface of the lip.

DETAILED DESCRIPTION

Figure 3:
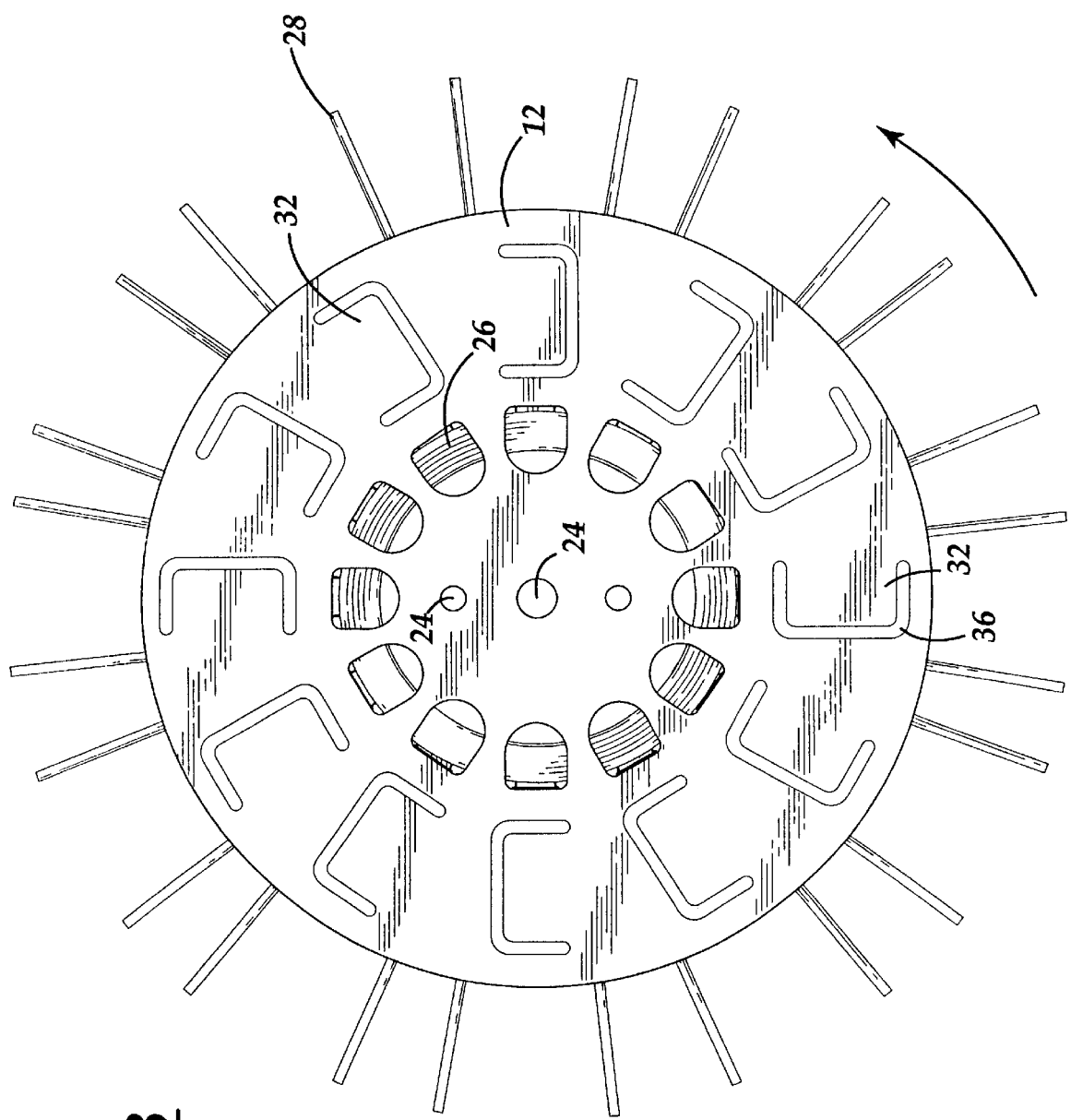
FIG. 3 is a bottom planar view of an alternate rotary blade designed for clockwise rotation.

In conjunction with the several views of the figures, details of representative embodiments will next be presented. A rotary blade generally shown at 10 is adapted for attachment to a rotary shaft of a vegetation cutting mechanism. Without any limitation intended, the vegetation cutting mechanism may be of the rotary mower, mulcher, edger or trimmer type.

The rotary blade shown in FIG. 1 is inverted from the normal alignment with the ground. The rotary blade 10 includes a disc 12 and annular ring 14. The disc 12 is generally planar, having a lower and upper surface 16 and 18 respectively, with an outer diameter 20 defining a perimeter of the disc 12. A lip 22 extends upward from the outer diameter 20 of the disc 12. The lip 22 provides rigidity to the disc 12 and further increases the relative thickness of the outer edge, thereby forming a blunt outer edge 20.

A plurality of centrally disposed bores 24 extend through the thickness dimension of the disc 12 and are adapted to universally receive a rotary shaft and/or fastener of the vegetation cutting mechanism. A plurality of radially spaced fingers or hooks 26 extend downward from the lower planar surface 16 and inward towards the central axis of the disc 12 (see FIGS. 1, 2 and 4). The ring 14 snaps under the hooks 26, thereby securing the ring 14 against the lower planar surface 16 of the disc 12.

The ring includes a plurality of filaments 28 extending radially from a central hub 30 formed by the body of the ring 14 (see FIGS. 1 and 4). The filaments 28 are u-shaped wherein the curved portion of the u-shaped filament 28 is molded into the hub 30. Each end of the filament 28 extends out of the hub 30 and the u-shaped filaments are spaced about the hub 30 such that, when the ring is secured to the disc 12 under the hooks 26, each end of the filament 28 extends between the radially spaced hooks 26 and outward beyond the outer edge 20 of the disc 12. Those skilled in the art will appreciate that the length of the filaments may be varied depending upon the intended use of the rotary blade 10 and desired cutting surface width. The hooks 26 also provide structural support to the ring, wherein there is a reduced likelihood that the filament 28 will separate from the hub 30, when each curved portion of the u-shaped filament 28 is aligned behind a corresponding hook 26.

In the preferred embodiment, the disc 12 is manufactured from a metal suitable for die press molding. Those skilled in the art will appreciate that the disc 12 may equally be molded from a polymer and include molded inserts to increase the weight of the polymer disc 12. Without any limitation intended, the ring 14 is manufactured from a flexible yet tough polymer such as polyethylene, nylon or polyurethane, with the filament 28 molded into the hub 30 of the ring 14. Without any limitation intended, the filament 28 comprises a heat stabilized base resin of nylon, for example, filled with small sharp particles of silicon carbide or aluminum oxide. Of course, those skilled in the art will recognize that other small, durable fillers may be blended with a base resin to form a suitable cutting filament.

The disc 12 may further have projections 32 extending upward from the upper planar surface 18 of the disc 12. Without any limitation intended, the projections 32 extend from the upper planar surface at an angle. Without any limitation intended, in the preferred embodiment the projections 32 extend at a 30° angle from the upper planar surface. As the disc 12 is rotated counter-clockwise (a rotation arrow is indicated in FIG. 1), the projections 32 create an air turbulence that both tends to lift the vegetation upward and swirls the clippings about the central axis of the disc 12. Those skilled in the art will appreciate that the projections 32 may extend from the upper planar surface sufficient to create an air turbulence when the disc 12 is rotated in a clockwise direction (see FIG. 3). Apertures 36 extend through the thickness dimension of the disc 12 and each aperture is aligned with a corresponding projection 32 to thereby create a passage for the air to pass through as the disc is rotated (see FIGS. 1 and 3). The apertures 36 further enhance the ability of the projections to create a lifting turbulence.

Having described the constructional features, the mode of use will now be discussed. For exemplary purposes, the rotary blade 10 will be described attached to a mower of known construction which operates above 3,000 rpms. The operator aligns the disc 12 with the rotary shaft of the lawn mower and secures the disc 12 to the shaft with a nut or other conventional fastener. A ring 14 is then secured to the disc 12, aligning the filaments 28 between the hooks 26.

As the rotary blade 10 is used, it may become necessary to replace the filaments 28. The operator stops the lawn-mower engine, and waits until the rotary shaft and rotary blade 10 have stopped spinning. Then the operator unsnaps the ring 14 from the hooks 26 and replaces it with a replacement ring 14. In this manner, the time spent on blade replacement and sharpening is substantially reduced.

As the lawn mower is propelled over vegetation to be cut, when the rotary shaft of the lawn mower spins, the air turbulence created by the projections 32 tends to lift the vegetation upwards as the filaments 28 of the rotary blade 10 cut the vegetation. The air turbulence also swirls the cut vegetation about the internal housing of the mower and out the mower's chute. The centrifugal force of the rotating rotary blade 10 keeps the ring 14 secured against the disc 12 and hooks 26.

This invention has been described herein in considerable detail in order to comply with the patent statutes and to provide those skilled in the art with the information needed to apply the novel principles and to construct and use such specialized components as are required. However, it is to be understood that the invention can be carried out by specifically different devices, and that various modifications, both as to the equipment details and operating procedures, can be accomplished without departing from the scope of the invention itself.

What is claimed is:

1. A device adapted for attachment to a vegetation cutting mechanism for cutting grass and the like, said device comprising:

(a) a disc for removable attachment to a mounting member of a rotary shaft of a vegetation cutting mechanism, said disc having an upper and lower planar surface, an outer perimeter, and a bore extending between said upper and lower surface, said bore being adapted for receiving a portion of the rotary shaft of the vegetation cutting mechanism, wherein the upper surface of said disc engages against the mounting member of said rotary shaft;

(b) an annular ring including a central hub and a plurality of cutting filaments extending radially outward from said central hub, said ring being positioned on the lower planar surface of said disc such that said plurality of cutting filaments extend outward beyond the outer perimeter of said disc; and (c) retaining means for removably securing the ring against the lower planar surface of said disc.

2. The device as recited in claim 1, wherein the disc further comprises a plurality of radially spaced projections extending outward and upward from said upper planar surface.

3. The device as recited in claim 2, wherein said disc further has a plurality of apertures extending between said upper and lower planar surfaces of said disc and aligned to correspond with said plurality of projections.

4. The device as recited in claim 1, wherein the disc further comprises a plurality of radially spaced projections extending upward from said upper planar surface, said disc further having a plurality of apertures extending between said upper and lower planar surfaces of said disc and aligned to correspond with said plurality of projections.

5. The device as recited in claim 1, wherein said disc further comprises a lip extending upward from the outer perimeter of said disc, wherein said lip provides rigidity to said disc.

6. The device as recited in claim 4, wherein said disc further comprises a lip extending upward from the outer perimeter of said disc, wherein said lip provides rigidity to said disc.

7. The device as recited in claim 1, wherein said filaments are manufactured from a polymer filled with a carbide filler.

8. A device adapted for attachment to a vegetation cutting mechanism for cutting grass and the like, comprising:
   (a) a disc for removable attachment to a mounting member of a rotary shaft of a vegetation cutting mechanism, said disc having an upper and lower planar surface, an outer perimeter, and a central bore extending between the upper and lower planar surface of said disc, said bore being adapted for receiving a portion of the rotary shaft of the vegetation cutting mechanism, wherein the upper surface of said disc engages against the mounting member of said rotary shaft;
   (b) radially spaced projections extending upward from said upper planar surface of said disc;
   (c) an annular ring including a central hub and a plurality of cutting filaments extending radially outward from said central hub, said ring being positioned on the lower planar surface of said disc such that said plurality of cutting filaments extend outward beyond the perimeter of said disc; and
   (d) retaining means for removably securing the ring against the lower planar surface of said disc.

9. The device as recited in claim 8, wherein said disc further has a plurality of apertures extending through said disc and aligned to correspond with said plurality of projections.

10. The device as recited in claim 8, wherein said disc further comprises a lip extending upward from the outer perimeter of said disc, wherein said lip provides rigidity to said disc.

11. The device as recited in claim 8, wherein said filaments are manufactured from a polymer filled with a carbide filler.

12. A device adapted for attachment to a vegetation cutting mechanism for cutting grass and the like, said device comprising:
   (a) a disc for removable attachment to a mounting portion of a rotary shaft of a vegetation cutting mechanism, said disc having an upper and lower planar surface, an outer perimeter having a first diameter, and a bore extending between said upper and lower surface, said bore being adapted for receiving the rotary shaft of the vegetation cutting mechanism, wherein the upper surface of said disc engages against the mounting portion of said rotary shaft;
   (b) radially spaced projections extending outward and upward from said upper planar surface of said disc;
   (c) an annular ring including a central hub and a plurality of cutting filaments extending radially outward from said central hub, said hub having an outer perimeter dimensioned less than the first diameter of said disc, said hub being positioned on the lower planar surface of said disc such that said plurality of cutting filaments extend outward beyond the perimeter of said disc; and
   (d) retaining means for removably securing the ring against the lower planar surface of said disc.

13. The device as recited in claim 12, wherein said retaining means comprises a plurality of L-shaped radially spaced hook members extending from said disc that engage the hub near the outer perimeter of the hub.

14. The device as recited in claim 12, wherein said disc further has a plurality of apertures extending between said upper and lower planar surfaces of said disc and aligned to correspond with said plurality of projections.

15. The device as recited in claim 12, wherein said disc further comprises an annular lip extending upward from the outer perimeter of said disc, wherein said lip provides rigidity to said disc.

16. The device as recited in claim 12, wherein said filaments are manufactured from a polymer filled with a carbide filler.

* * * * *